(12) United States Patent
Kay (10) Patent No.: US 7,249,907 B2
(45) Date of Patent: Jul. 31, 2007

(54) SPRING LOADED TURNBUCKLE WITH QUICK DISCONNECT

(76) Inventor: Jon D. Kay, 14442 SE. 318, Auburn, WA (US) 98092

( * ) Notice: Subject to any disclaimer, the term of this patent is extended or adjusted under 35 U.S.C. 154(b) by 132 days.

(21) Appl. No.: 11/015,177

(22) Filed: Dec. 17, 2004

(65) Prior Publication Data

US 2005/0191118 A1    Sep. 1, 2005

Related U.S. Application Data

(60) Provisional application No. 60/549,323, filed on Mar. 1, 2004.

(51) Int. Cl.
*F16B 7/06* (2006.01)
*F16G 11/12* (2006.01)

(52) U.S. Cl. ............... 403/48; 403/45; 403/46; 403/53

(58) Field of Classification Search .......... 403/43, 403/45, 46, 53; 254/243, 246, 256, 261
See application file for complete search history.

(56) References Cited

U.S. PATENT DOCUMENTS

| | | | |
|---|---|---|---|
| 304,815 A * | 9/1884 | Flynn | 254/256 |
| 1,208,182 A * | 12/1916 | Martin | 296/36 |
| 1,247,760 A | 11/1917 | Wengraf | |
| 1,374,963 A | 4/1921 | Stevenson | |
| 1,393,614 A | 10/1921 | Ferragamo | |
| 1,413,328 A | 4/1922 | Ferragamo | |
| 2,359,492 A * | 10/1944 | Rockwood et al. | 403/43 |
| 2,465,621 A | 3/1949 | Wheeler | |
| 2,705,725 A * | 4/1955 | Bible, Jr. et al. | 560/255 |
| 2,793,892 A * | 5/1957 | Hutterer | 292/36 |
| 3,051,519 A * | 8/1962 | Sudeikis | 403/43 |
| 3,377,036 A | 4/1968 | McNatt et al. | |
| 3,402,961 A | 9/1968 | Larson | |
| 3,610,606 A | 10/1971 | Andrews | |
| 3,623,690 A | 11/1971 | Bargman, Jr. | |
| 3,751,083 A | 8/1973 | Jacobson et al. | |
| 3,782,774 A | 1/1974 | Sturek | |
| 3,837,701 A | 9/1974 | Curtis et al. | |
| 3,938,844 A | 2/1976 | Johnson, Jr. | |
| 4,025,207 A | 5/1977 | Johnson, Jr. | |
| 4,090,691 A | 5/1978 | Bingaman | |
| 4,335,489 A | 6/1982 | Muller et al. | |
| 4,401,333 A | 8/1983 | Merry | |
| 4,458,940 A * | 7/1984 | Hildebrand | 296/183.2 |
| 4,573,842 A | 3/1986 | Mantela et al. | |
| 4,693,097 A | 9/1987 | Rivera | |
| 4,778,194 A | 10/1988 | Koch et al. | |
| 5,680,676 A | 10/1997 | Spirk et al. | |
| 5,702,196 A | 12/1997 | Petercsak | |
| 5,704,668 A | 1/1998 | Ferrato | |
| 5,765,957 A | 6/1998 | Connell | |
| 6,048,146 A * | 4/2000 | Wiedmeyer | 410/100 |

(Continued)

*Primary Examiner*—Daniel P. Stodola
*Assistant Examiner*—Joshua T. Kennedy
(74) *Attorney, Agent, or Firm*—R. Reams Goodloe, Jr.

(57) ABSTRACT

A spring loaded tensioning device. The device includes an elongated tubular member containing a spring loaded rod which extends through a lower stop on the tubular member to an attachment feature such as a hook. At the upper end of the tubular member, a pivot housing is provided to secure a pivotable handle, as well as to provide apertures for locking the device via pin, or a padlock or similar device.

44 Claims, 5 Drawing Sheets

U.S. PATENT DOCUMENTS

| | | |
|---|---|---|
| 6,050,737 A | 4/2000 | Russell |
| 6,056,069 A | 5/2000 | Hagen et al. |
| 6,065,914 A | 5/2000 | Fotou |
| 2005/0254886 A1 | 11/2005 | Kay |

* cited by examiner

SPRING LOADED TURNBUCKLE WITH QUICK DISCONNECT

RELATED PATENT APPLICATIONS

This invention is related to my U.S. Provisional Patent Application Ser. No. 60/549,323, filed Mar. 1, 2004, entitled SPRING LOADED TURNBUCKLE WITH QUICK DISCONNECT, the disclosure of which is incorporated herein in its entirety by this reference.

COPYRIGHT NOTICE

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to the field of turnbuckles, and more particularly, to quickly releasable turnbuckle like devices.

BACKGROUND

Turnbuckles have been used for many years, and various versions have long provided their unique attributes for various tasks where it was desired to tighten the connection between two anchor points. In various turnbuckle designs, the use of a spring has been adapted to include a way to assure tensioning when for some reason the distance between the two anchor points might change or periodically vary to some limited extent. One situation where adjustable tensioning devices are desirable are those applications where loads are situated on transport vehicles, such as trucks. Many different types of turnbuckles for tensioning connections between loads and transport vehicles, or less commonly, between stationary objects and secure anchor points, are in use today.

Especially in the case of securing loads to transport vehicles, it would be a distinct and important improvement to provide a spring loaded tensioning device which is quickly and easily secured between selected anchor points. Moreover, it would be desirable to provide a design which can be quickly released from between anchor points, thus allowing the tensioning device to be easily removed. Thus, the important advantages of a product providing such desirable features in a workable tensioning apparatus can be readily appreciated.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of a spring loaded turnbuckle device, especially as applied for different variations of the functional components illustrated, as well as different embodiments of artistic elements such as a handle design, may be utilized in order to provide a robust spring loaded turnbuckle device with quick disconnect capability.

DETAILED DESCRIPTION

Figure 1:
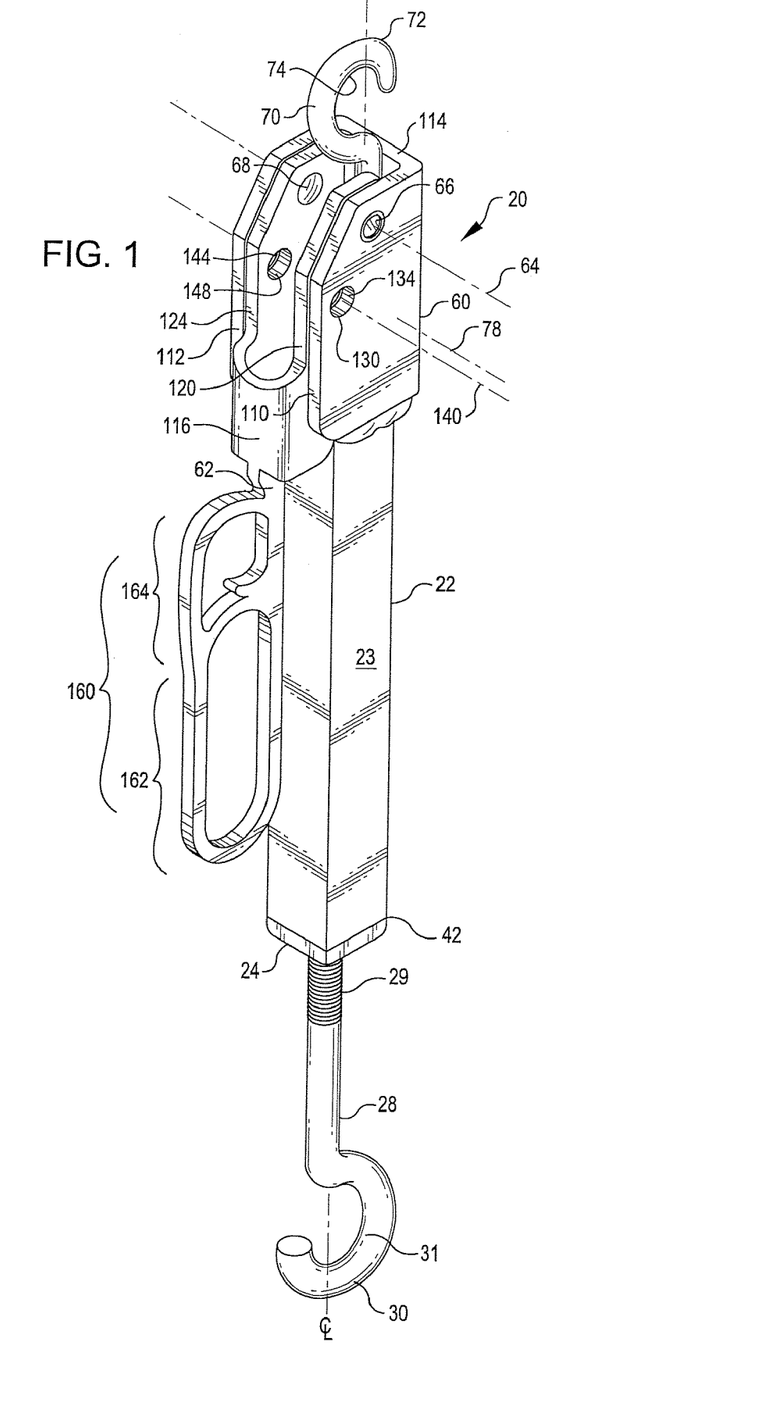
FIG. 1 is a perspective view of a spring loaded turnbuckle device with a pivotable quick release handle, configured for securing a first or upper hook, and showing the use of a tubular member in which a spring loaded threaded rod having a second or lower hook is utilized.

Turning now to FIG. 1, a perspective view of a spring loaded turnbuckle device 20 is provided. The device includes an elongated structural member 22 extending along a longitudinal axis 21 (see centerline $C_L$, also). In one embodiment the elongated member 22 can be provided in the form of a square tubular member (which, for purposes of the claims of this patent, such square tubular member shall be considered to be expanded in definition to take in not only include the aforementioned square cross-sectional shape, but also a rectangular cross-sectional shape, and, as well (in solid form) any parallelepiped having a hollow center portion). The elongated member 22 in the form of a tubular member as indicated in FIG. 1 includes exterior sidewalls 23, a bottom (partial) plug 24, an elongated rod 28 and in one embodiment having threads 29, and an attachment feature at the lower end 30 such as hook 31.

Figure 5:
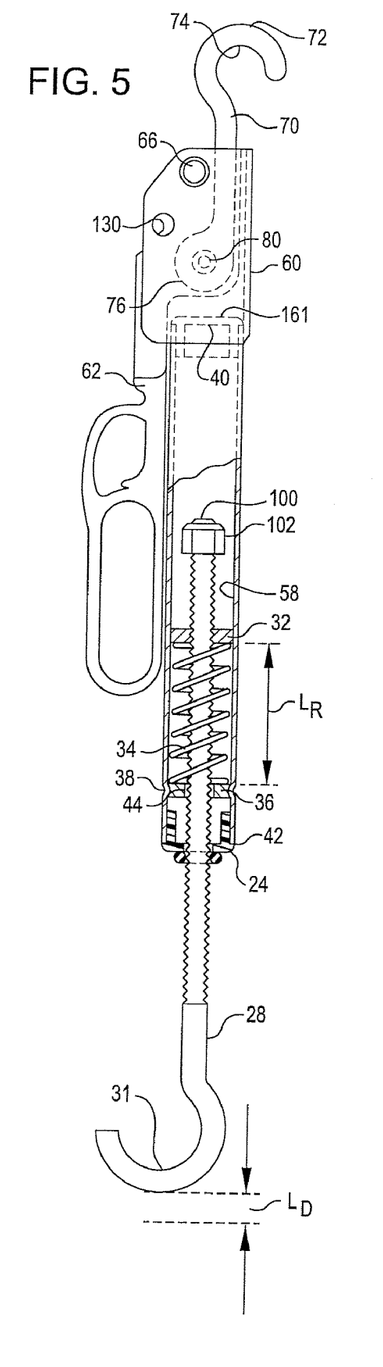
FIG. 5 is a partially cut away side view of an adjustable turnbuckle, showing the spring length at a first position with no load on the lower hook, and indicating with reference lines only the spring length when compressed as if a load had been placed on the lower hook.
Figure 6:
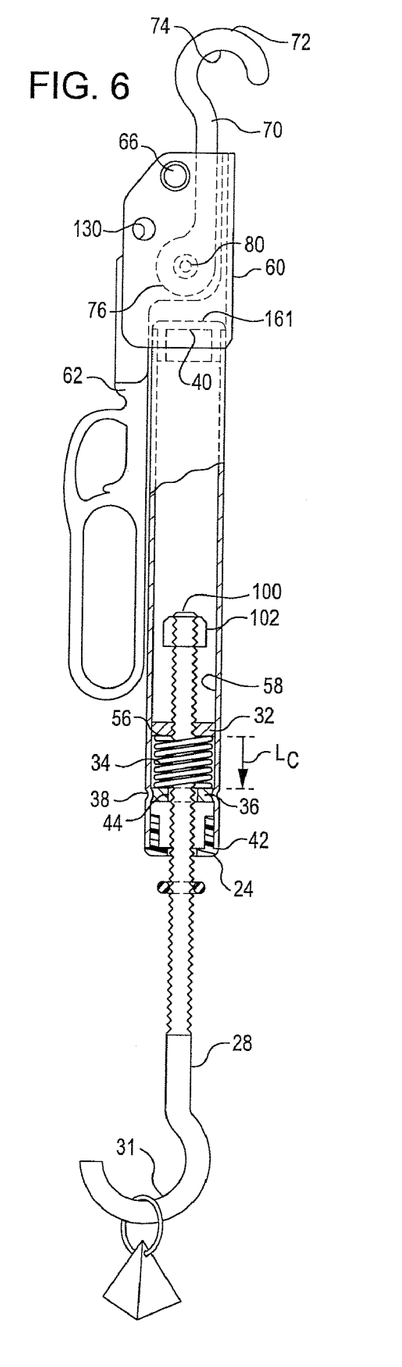
FIG. 6 is a partially cut away side view of an adjustable turnbuckle, showing the compressed spring length at a second position when a load is placed on the lower hook.

As better seen in FIGS. 5 and 6, an adjustment nut 32 is adjustably secured to threaded portion of elongated rod 28 at a suitable location to cage a compression spring 34 against bottom end stop 36. Accordingly, the adjustment nut 32 is dimensioned for interference anti-rotation fit within the interior walls 58 of elongated member 22. In one embodiment, bottom stop 36 is securely fixed within an indented portion 38 of innerwalls 58 of the elongated square tubular structure 22.

The elongated member 22 has an upper or first end 40 and a second or lower end 42. The bottom or end stop 36 is located at or spaced apart at least some distance from the second or lower end 42. The bottom end stop 36 has a passageway therethrough defined by throughwall portions 44, for accommodating in reciprocating fashion the rod 28, and usually (but not necessarily) along threaded upper portion 29 of rod 28.

A compression spring 34 is provided alongside or adjacent rod 28, which in one embodiment as illustrated in FIGS. 5 and 6, the compression spring 34 may be centered around and/or encircle at least some of the upper portion of the rod 28. In any event, the compression spring 34 is disposed adjacent a portion of the rod 28, including in some embodiments, adjacent a threaded portion 29 of rod 28. Compression spring 34 has a lower end 50 situated for compression against the bottom end stop 36 located within the elongated member 22.

An adjustment nut 32 is threadably engaged with the upper portion 54 of threaded portion 29 of rod 28 in a manner which provides a retaining surface 56 below adjustment nut 32, so as to secure the compression spring 34 downwardly therefrom. As illustrated in FIGS. 5 and 6, the adjustment nut 32 is caged or secureable against interior walls 58 of elongated member 22 rotation when the threaded rod 28 is rotated with respect to the elongated member 22.

Figure 2:
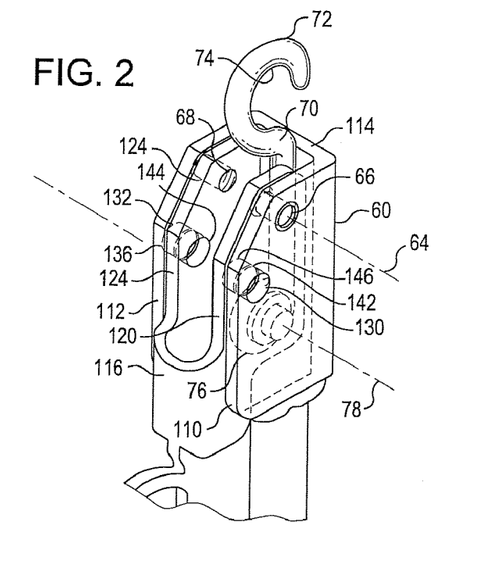
FIG. 2 is a partial perspective view of a spring loaded turnbuckle with a pivotable quick release handle similar to the view just illustrated in FIG. 1 above, but now showing in hidden lines the details of pivotal attachment of the upper attachment device or hook.

A pivot housing 60 is provided secured to the elongated member 22, and as illustrated in FIGS. 5 and 6, is secured at or adjacent the upper end 40 of elongated member 22. A pivotable handle 62 is pivotably secured to the pivot housing 60 along a first pivot axis 64 (see FIGS. 1 and 2). First 66 and in one embodiment second 68 pivot pins are disposed along first pivot axis 64 to pivotally connect the pivot handle 62 with the pivot housing 60.

Figure 4:
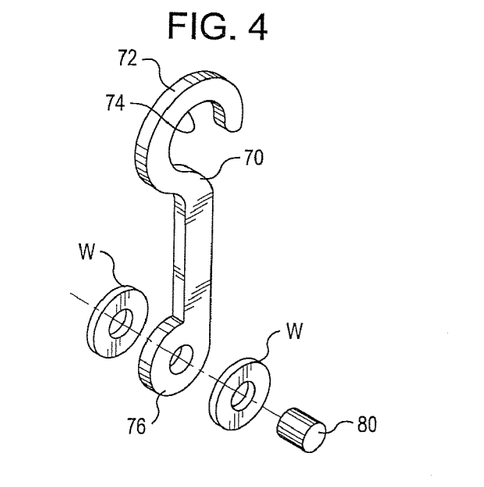
FIG. 4 is an exploded perspective of an upper attachment device, showing the upper end with an attachment feature or hook, and a lower end sized and shaped to accommodate a pivot pin therethrough, with washers adjacent along the pivot axis for ease of movement.
Figure 7:
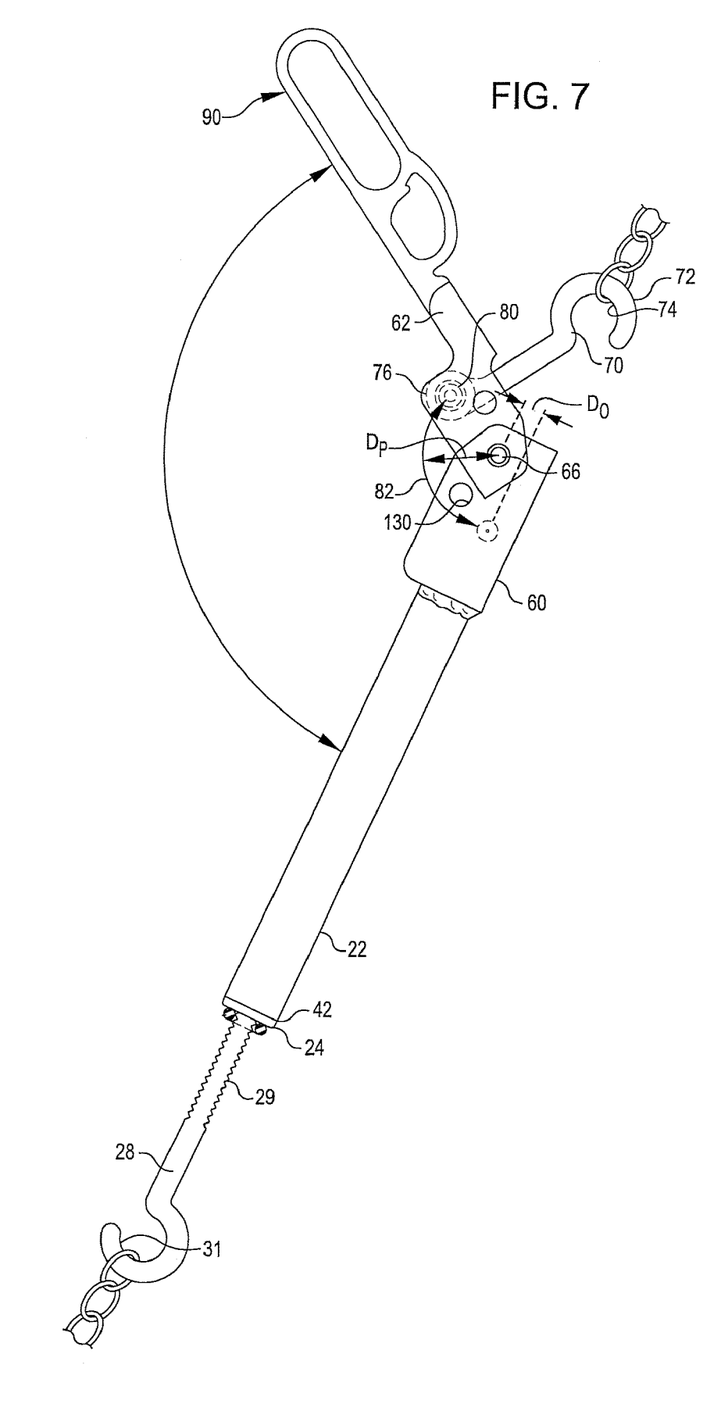
FIG. 7 illustrates the operation of the spring loaded turnbuckle, and illustrates the device in an open position, before closing the handle and securing the turnbuckle.
Figures 8, 9:
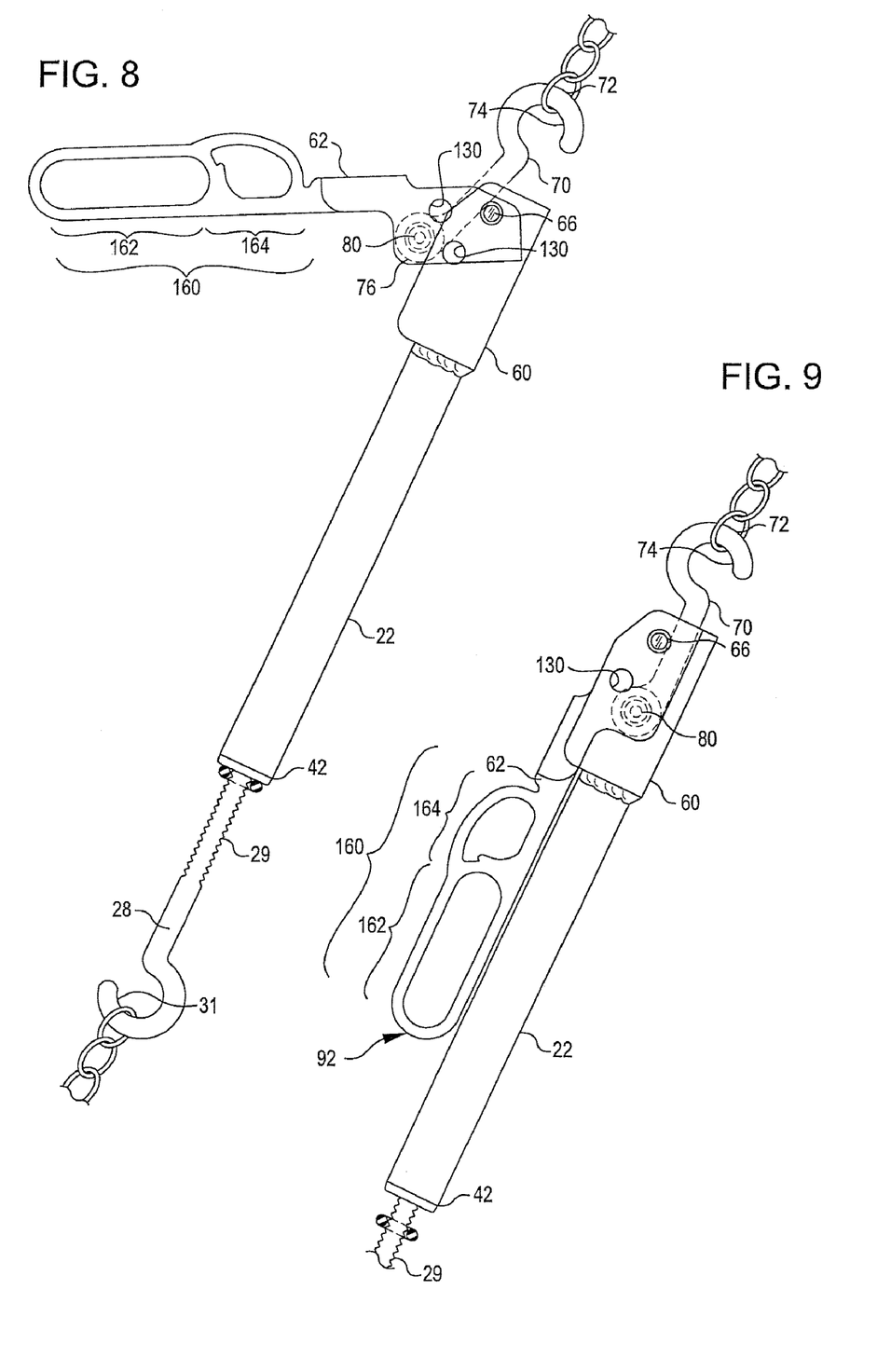
FIG. 8 illustrates the operation of the spring loaded turnbuckle just illustrated in FIG. 7 above, and shows the handle having been moved partially toward the closed position.
FIG. 9 shows the operation of the turnbuckle just illustrated in FIGS. 7 and 8 above, now showing the handle fully closed, ready to accept a locking pin, as illustrated in FIG. 3 above.

An upper attachment device 70 having an upper end 72 with an attachment feature such as a hook 74 is provided. The upper attachment device 70 has a lower end 76 pivotally affixed to the pivotable handle 62 along a second pivot axis 78, using hook pivot pin 80 (see FIG. 4). As can be appreciated by review of FIG. 7, the lower end 76 of the upper attachment device 70 is displaceable arcuately along arc indicated by reference numeral 82 in a direction outward from the elongated member 22 and thus increasing the distance between the second pivot axis 78 and the lower end 42 of the elongated member 22, when the pivotable handle 62 is moved toward a first, open position 90 as seen in FIG. 7. The lower end 76 of the upper attachment device 70 is displaceable arcuately 82 in a direction inward toward a the elongated member 22 and decreasing the distance between the second pivot axis 78 and the second end 42 of elongated member 22 when the pivotable handle 62 is moved toward a second, closed position 92 as indicated in FIG. 9. As can be seen by comparison of FIGS. 7 and 9, in one embodiment, an "over centered" configuration is utilized so that the turnbuckle handle 62 will be stable in a closed position 92, since when in the closed position 92, the first pivot axis 64 and the second pivot axis 78 are not centered along the longitudinal axis of elongated member 22. Rather, the second pivot axis 78 is offset rearward from the first pivot axis 64 by a preselected offset distance of $D_o$ as indicated in FIG. 7.

At or near the upper end 100 of rod 28, a stop 100 may be provided. As indicated in FIGS. 5 and 6, a nut 102 may be utilized as a stop, and in one embodiment, a locking type nut 102 threadably secured to the upper threaded portion of the rod 28.

It is convenient to provide the pivot housing 60 with first 110 and second 112 frame members, and in one embodiment, a back 114. If desired, first 110, second 112, and back 114 frame members can be provided in a unitary, one-piece configuration. Also, to make a compact and protectable turnbuckle, the pivotable handle 62 can be provided in an embodiment wherein a wishbone shaped upper end 116 is provided having opposing third 120 and fourth 124 frame members. As illustrated, the first 110 and third 120 frame members are pivotally secured one to the other by a first handle pivot pin 66. The second 112 and fourth 124 frame members are pivotally secured one to the other by a second handle pivot pin 68. As earlier noted, the first 66 and second 68 handle pivot pins are located along a common axis of rotation 64. For the embodiment depicted in FIG. 2, the common axis of rotation 64 is transverse to the longitudinal axis of the elongated member 22.

For one embodiment shown, the lower end 76 of upper attachment device 70 is pivotally affixed to pivotable handle 62 at a second pivot 78 axis extending between the third 120 and fourth 124 frame members, by pivot pin 80, and between washers W. The second pivot axis 78 is parallel to the common axis of rotation 64 of first 66 and second 68 handle pivot pins. As shown, the second pivot axis 78 and the common axis of rotation 64 are centered by a spaced apart selected distance $D_p$. For small turnbuckles as might be useful for attachment between pickup trucks and campers, a center to center pivot distance $D_p$ of at least one inch can be utilized. More preferably, the preselected center to center spaced apart distance $D_p$ is about one and one-half inches.

In order to provide security, or use of locks, the first frame 110 and second frame 112 have first 130 and second 132 frame apertures therethrough defined by first frame aperture throughwalls 134 and second frame aperture throughwalls 136, respectively. First 130 and second 134 frame apertures are aligned along a common aperture axis 140 transverse to the longitudinal axis of the elongated member 22.

The third 120 and said fourth 124 frames have third 142 and fourth 144 frame apertures therethrough defined by third frame aperture throughwall 146 and fourth frame aperture throughwall 148, respectively. The first 130, second 134, third 142, and fourth 144 frame apertures are aligned along a common axis 140 transverse to the longitudinal axis of the elongated member 22.

Figure 3:
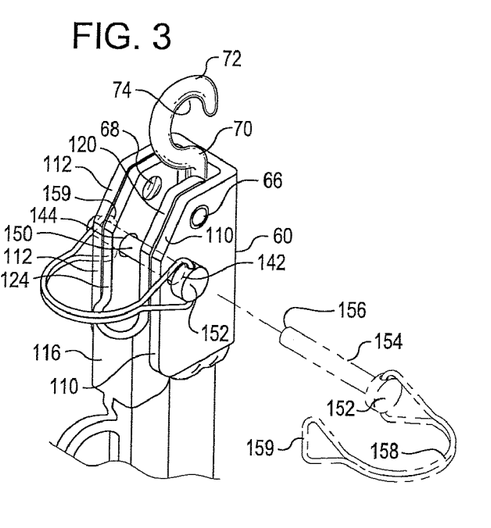
FIG. 3 is a partial perspective view of a spring loaded turnbuckle device, similar to the view showing in FIG. 1 above, but now additionally showing use of a locking pin with spring loaded catch, as well as in hidden lines, the locking pin when removed.

Turning now to FIG. 3, a locking pin 150 can be provided to secure turnbuckle 20 in a closed position. The locking pin 150 is sized and shaped for releasable mating engagement through the said first 130, second 134, third 142, and fourth 144 frame apertures and thus with the first 110, second 112, third 120, and fourth 124 frames. In this manner, when the said pivotable handle 62 is placed in the second, closed position 92, the first 130, second 134, third 142, and fourth 144 frame apertures are in alignment along axis 140. The locking pin 150 has a head 152, a shaft portion 154, and a distal end 156. A generally U-shaped spring catch 158 is provided pivotally affixed to the head portion 152. The catch 158 includes a bootstrap end portion 160 which is releasably spring latchable over the distal end 156 of the locking pin 150. In one embodiment, the shaft portion 154 of the locking pin 150 is cylindrical in shape. In such a case, the first 130, second 134, third 142, and fourth 144 apertures are provided in complementary size and shape for close fitting mating engagement.

The pivotable handle 62 may be provided with an upper end having a wishbone shape 116 with outwardly extending opposing frame members 120 and 124. The upper attachment device 70 is thus pivotally secured between frame members 120 and 124 via pivot pin 80. Pivotable handle 62 may include a functional as well as decorative grip end portion 160. The size and shape of the grip end portion is configured for the fitting of at least some of a user's fingers therethrough. In one embodiment, for example as seen in FIGS. 8 and 9, the grip end portion 160 may include a lever portion 162 and a trigger portion 164. Then, the lever portion 162 is sized and shaped for fitting of a plurality of a user's fingers therethrough. More fundamentally, the functional shape of the grip end portion 160 may be provided in a rifle handle and trigger lock configuration as seen in FIG. 9. Such a configuration provides for ease of use; however, other pivotable handle 62 configurations may be provided.

The elongated member 22 may be provided in a stainless steel material, and of a tubular stainless steel, such as a square tubular stainless steel part, to virtually eliminate rusting. For enhancing the look of a turnbuckle 20 when installed on a vehicle, the turnbuckle may be painted with a rust resistant powder coated finish in a selected color.

For additional weather protection, the upper end 40 of elongated member 22, when provided in tubular configuration, may be provided with a plug 160 to effectively seal the upper or first end 40 of the tubular member against the weather.

It is to be appreciated that the various aspects and embodiments of a spring loaded quick disconnect turnbuckle device as described herein are an important improvement in the state of the art. The spring loaded quick disconnect turnbuckle is simple, robust, reliable, and susceptible to use in a variety of applications. Although only a few exemplary embodiments have been described in detail, various details are sufficiently set forth in the drawings and in the specification provided herein to enable one of ordinary skill in the art to make and use the invention(s), which need not be further described by additional writing in this detailed description.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings.

The invention claimed is:

1. An adjustable tensioning turnbuckle, comprising:
   an elongated member extending along a longitudinal axis and having a first end and a second end, and located at or spaced apart at least some distance from said second end, an end stop having a passageway therethrough defined by throughwall portions;
   a rod, said rod having a threaded upper portion, at least a portion of said threaded upper portion disposed along said elongated member, and said rod having a lower end comprising an attachment feature;
   a compression spring, said compression spring disposed adjacent a portion of said threaded rod and having a lower end situated for compression against said end stop of said elongated member;
   an adjustment nut threadably engaged with said upper portion of said threaded rod so as to secure said compression spring downwardly therefrom, said adjustment nut caged or secureable against rotation when said threaded rod is rotated with respect to said elongated member;
   a pivot housing, said pivot housing secured to said elongated member;
   a pivotable handle, said pivotable handle secured to said pivot housing at a first pivot axis;
   an upper attachment device having an upper end with an attachment feature and a lower end pivotally affixed to said pivotable handle at a second pivot axis;
   said lower end of said upper attachment device displaceable arcuately in a direction outward from said elongated member and increasing the distance between said second pivot axis and said second end of said elongated member when said pivotable handle is moved toward a first, open position; and
   said lower end of said upper attachment device displaceable arcuately in a direction inward toward said elongated member and decreasing the distance between said second pivot axis and said second end of said elongated member when said pivotable handle is moved toward a second, closed position;
   so that when said tensioning turnbuckle is in said second, closed position, the action of said compression spring biases the adjustment nut towards the first end of said elongated member to provide tension between said rod and said upper attachment device.

2. The device set forth in claim 1, wherein said elongated member comprises a tubular member.

3. The device as set forth in claim 2, wherein said tubular member comprises a square tubular member.

4. The device as set forth in claim 1, wherein said compression spring encircles at least some of said upper portion of said rod.

5. The device as set forth in claim 2 or in claim 3, wherein said tubular member comprises interior walls, and wherein said adjustment nut is secured against rotation with respect to said interior walls.

6. The device as set forth in claim 5, wherein said adjustment nut is dimensioned for interference anti-rotation fit within said interior walls of said tubular member.

7. The device as set forth in claim 1, wherein said rod further comprises, at the upper reaches thereof, a stop.

8. The device as set forth in claim 7, wherein said stop comprises a stop nut, said stop nut threadably secured to said upper threaded portion of said rod.

9. The device as set forth in claim 1, wherein said pivot housing, said pivot housing comprises opposing first and second frame members, and
   and wherein said pivotable handle comprises an upper end having opposing third and forth frame members, and wherein said first and said third frame members are pivotally secured one to the other by a first handle pivot pin, and wherein said second and fourth frame members are pivotally secured one to the other by a second handle pivot pin, and wherein said first and second handle pivot pins are located along a common axis of rotation.

10. The device as set forth in claim 9, wherein said common axis of rotation is transverse to said longitudinal axis of said elongated member.

11. The device as set forth in claim 9, wherein said lower end of said upper attachment device is pivotally affixed to said pivotable handle at a second pivot axis extending between said third and said fourth frame members, and wherein said second pivot axis is parallel to said common axis of rotation of said first and said second handle pivot pins.

12. The device as set forth in claim 11, wherein said second pivot axis and said common axis of rotation are centered by a spaced apart selected distance D.

13. The device as set forth in claim 12, wherein said preselected distance $D_p$ is at least one inch.

14. The device as set forth in claim 12, wherein said preselected distance $D_p$ is about one and one-half inches.

15. The device as set forth in claim 9, wherein said first frame and said second frame have first and second frame apertures therethrough defined by first frame aperture throughwalls and second frame aperture throughwalls, respectively, and wherein said first and said second frame apertures are aligned along a common axis transverse to said longitudinal axis of said elongated member.

16. The device as set forth in claim 15, wherein said third and said forth frames have third and fourth frame apertures therethrough defined by third frame aperture throughwalls and fourth frame aperture throughwalls, respectively, and wherein said first, second, third, and fourth frame apertures are aligned along a common axis transverse to said longitudinal axis of said elongated member.

17. The device as set forth in claim 16, further comprising a locking pin, said locking pin sized and shaped for releasable mating engagement through said first, second, third, and fourth frame apertures and thus with said first, second, third, and fourth frames, when said pivotable handle is placed in said second, closed position so that said first, second, third, and fourth apertures are in alignment.

18. The device as set forth in claim 17, wherein said locking pin further comprises a head portion, a shaft portion, and a distal end, and wherein U-shaped spring catch is pivotably affixed to said head portion, said catch having a bootstrap end portion which is releasably spring latchable over said distal end of said locking pin.

19. The device as set forth in claim 18, wherein said shaft portion of said locking pin is cylindrical in shape, and wherein said first, second, third, and fourth apertures are provided in complementary size and shape for close fitting mating engagement.

20. The device as set forth in claim 1, wherein said pivotable handle comprises an upper end portion having a wishbone shape, said wishbone shape comprising opposing frame members pivotally securing said upper attachment device therebetween.

21. The device as set forth in claim 1, wherein said pivotable handle comprises a grip end portion, said grip end portion size and shaped for fitting of at least some of a user's fingers therethrough.

22. The device as set forth in claim 21, wherein said grip end portion comprises a lever portion and a trigger portion.

23. The device as set forth in claim 22, wherein said lever portion is sized and shaped for fitting of a plurality of a user's fingers therethrough.

24. The device as set forth in claim 21, wherein said grip end portion comprises a rifle handle trigger lock configuration.

25. The device as set forth in claim 2, wherein said tubular member comprises stainless steel.

26. The device as set forth in claim 1, wherein said device further comprises a rust resistant powder coated finish.

27. An adjustable turnbuckle, comprising:
an elongated square tubular member having a first end and a second end, and located at or spaced somewhat from said second end, an end stop having an aperture therethrough defined by throughwall portions;
a threaded rod, said threaded rod having an upper end disposed within said elongated square tubular member and a lower end having an attachment feature;
a compression spring, said compression spring disposed about said upper portion of said threaded rod and having a lower end situated for compression against said end stop of said elongated square tubular member;
an adjustment nut threadably engaged with said upper end of said threaded rod so as to secure said compression spring downwardly therefrom, said nut sized and shaped for close fitting engagement within said elongated tubular structure and thus secured against rotation when said threaded rod is rotated with respect to said elongated square tubular member;
a pivot housing, said pivot housing secured to said upper end of said elongated tubular member, said pivot housing further comprising opposing first and second frame members;
a pivotable handle, said pivotable handle having third and fourth frame members pivotably secured to said pivot first and said second frame members, respectively, with first and second pivot pins along a common pivot axis;
an upper attachment device having an upper end with an attachment feature and a lower end pivotally affixed between said second said third frame members at a second pivot axis, said second pivot axis spaced a distance from said common pivot axis so that said lower end of said upper attachment device is displaced outwardly from said elongated square tubular member, and upwardly from said second or lower end of said elongated square tubular member, when said device is moved toward an open position, and is returned inwardly toward said elongated square tubular member and downwardly toward said second or lower end of said elongated tubular member when said device is moved toward a closed position.

28. The device as set forth in claim 2 or in claim 27, further comprising a plug to effectively seal said upper or first end of said tubular member.

29. An adjustable turnbuckle, comprising:
a pivot housing;
a pivotable handle, said pivotable handle secured to said pivot housing at a first pivot axis;
an upper attachment device having an upper end with an attachment feature and a lower end pivotally affixed to said pivotable handle at a second pivot axis;
said lower end of said upper attachment device displaceable arcuately in a direction outward from said elongated member and increasing the distance between said second pivot axis and said second end of said elongated member when said pivotable handle is moved toward a first, open position; and
said lower end of said upper attachment device displaceable arcuately in a direction inward toward a said elongated member and decreasing the distance between said second pivot axis and said second end of said elongated member when said pivotable handle is moved toward a second, closed position;

wherein said pivot housing comprises opposing first and second frame members, and and wherein said pivotable handle comprises an upper end having opposing third and forth frame members, and wherein said first and said third frame members are pivotally secured one to the other by a first handle pivot pin, and wherein said second and fourth frame members are pivotally secured one to the other by a second handle pivot pin, and wherein said first and second handle pivot pins are located along a common axis of rotation.

30. The device as set forth in claim 29, wherein said common axis of rotation is transverse to said longitudinal axis of said pivot housing.

31. The device as set forth in claim 29, wherein said lower end of said upper attachment device is pivotally affixed to said pivotable handle at a second pivot axis extending between said third and said fourth frame members, and wherein said second pivot axis is parallel to said common axis of rotation of said first and said second handle pivot pins.

32. The device as set forth in claim 31, wherein said second pivot axis and said common axis of rotation are centered by a spaced apart selected distance D.

33. The device as set forth in claim 32, wherein said preselected distance $D_p$ is at least one inch.

34. The device as set forth in claim 32, wherein said preselected distance $D_p$ is about one and one-half inches.

35. The device as set forth in claim 29, wherein said first frame and said second frame have first and second frame apertures therethrough defined by first frame aperture throughwalls and second frame aperture throughwalls, respectively, and wherein said first and said second frame apertures are aligned along a common axis transverse to said longitudinal axis of said pivot housing.

36. The device as set forth in claim 35, wherein said third and said forth frames have third and fourth frame apertures therethrough defined by third frame aperture throughwalls and fourth frame aperture throughwalls, respectively, and wherein said first, second, third, and fourth frame apertures are aligned along a common axis transverse to said longitudinal axis of said pivot housing.

37. The device as set forth in claim 36, further comprising a locking pin, said locking pin sized and shaped for releasable mating engagement through said first, second, third, and fourth frame apertures and thus with said first, second, third, and fourth frames, when said pivotable handle is placed in said second, closed position so that said first, second, third, and fourth apertures are in alignment.

38. The device as set forth in claim 37, wherein said locking pin further comprises a head portion, a shaft portion, and a distal end, and wherein U-shaped spring catch is pivotably affixed to said head portion, said catch having a bootstrap end portion which is releasably spring latchable over said distal end of said locking pin.

39. The device as set forth in claim 38, wherein said shaft portion of said locking pin is cylindrical in shape, and wherein said first, second, third, and fourth apertures are provided in complementary size and shape for close fitting mating engagement.

40. The device as set forth in claim 29, wherein said pivotable handle comprises an upper end portion having a wishbone shape, said wishbone shape comprising opposing frame members pivotally securing said upper attachment device therebetween.

41. The device as set forth in claim 29, wherein said pivotable handle comprises a grip end portion, said grip end portion size and shaped for fitting of at least some of a user's fingers therethrough.

42. The device as set forth in claim 41, wherein said grip end portion comprises a lever portion and a trigger portion.

43. The device as set forth in claim 42, wherein said lever portion is sized and shaped for fitting of a plurality of a user's fingers therethrough.

44. An adjustable turnbuckle, comprising:

an elongated tubular member having a first end and a second end, and located at or spaced somewhat from said second end, an end stop having an aperture therethrough defined by throughwall portions;

a threaded rod, said threaded rod having an upper end, a least a portion of said threaded rod disposed within said elongated tubular member;

a compression spring, said compression spring disposed within tubular member;

a nut threadably engaged with said upper end of said threaded rod a pivot housing, said pivot housing secured to said tubular member, said pivot housing further comprising opposing first and second frame members;

a pivotable handle, said pivotable handle having second and third frame members pivotably secured to said pivot first and said second frame members, respectively, with first and second pivot pins along a common pivot axis;

an upper attachment device having an upper end with an attachment feature and a lower end pivotally affixed between said second said third frame members at a second pivot axis, said second pivot axis spaced a distance from said common pivot axis so that said lower end of said upper attachment device is displaced outwardly from said elongated tubular member, and upwardly from said second or lower end of said elongated tubular member, when said device is moved toward an open position, and is returned inwardly toward said elongated tubular member and downwardly toward said second or lower end of said elongated tubular member when said device is moved toward a closed position.

* * * * *